Patented Aug. 19, 1930

1,773,102

UNITED STATES PATENT OFFICE

CHARLES B. GNADINGER, OF MINNEAPOLIS, MINNESOTA

INSECTICIDE AND METHOD OF MAKING SAME

No Drawing.      Application filed July 6, 1926. Serial No. 120,871.

This invention relates to new and useful improvements in insecticides and the method of making same and has particular reference to the provision of an insecticide which is stable and does not readily lose its toxic effect while standing, for example, on shelves in retail stores. The term "insecticide" is here used in its commonly accepted broader meaning instead of in its strict zoological meaning ing as inclusive only of the class "Insecta." It is here used not only to inculde such class but also to include worms, etc., as well as parasites, such for example, as those frequently found in the intestinal tracts of live stock.

The toxic principle of this novel insecticide is obtained from pyrethrum flowers (insect flowers). It is well-known in this art that these flowers contain an active principle which is deadly to the lower forms of animal life but is harmless to the higher forms of animal life. Among the pyrethrum flowers suggested for this purpose are: Chrysanthemum (*Pyrethrum*) *cinerariaefolium* (Trev.) Bocc.; Chrysanthemum (*Pyrethrum*) *roseum*, Web. & Mohr.; and Chrysanthemum *Marshalli Aschers*, (synonym, *Pyrethrum carneum* M. B.). Preferably only the ground or powdered flowers of these plants are used. It is also now well-known that the active principle of these flowers is not soluble in water although it was not until about the last two years that the active principles were isolated and identified to be esters of pyrethrolone with chrysanthemum-mono-carboxylic acid and chrysanthemum di-carboxylic acid.

This invention has reference to novel extract or solution of the active principle of pyrethrum flowers made with a non-poisonous solvent which is miscible with water. Furthermore, it may be pointed out that the alkalis (such as ammonia) and even soap will cause the gradual decomposition of the active principle. The useful solvents are ketones and alcohols—such for example as acetone or ethyl alcohol or isopropyl alcohol, although, as stated, any other solvent which will extract the active principle from the pyrethrum flowers and which is non-poisonous, non-alkaline, miscible with water and preferably free from objectionable odor may be used.

The solvent preferred at the present time for commercial production of the insecticide is acetone because of its ready supply and the comparative freedom from governmental restrictions as to transportation, possession and sale. The pyrethrum flowers are ground or powdered to a suitable fineness as is at present practiced in this art. The active principle is then extracted in any suitable apparatus with either cold or hot acetone, the acetone being caused to percolate through a mass of the ground material. There is thereby obtained an extract containing the active toxic portion of the pyrethrum flowers. The proportion of the flowers to acetone may be varied from a fraction of an ounce of flowers to a gallon of acetone, to several pounds of flowers to a gallon of acetone. The preferred proportions are one and two-thirds (1⅔) pounds of flowers to a gallon of acetone. The solution is then filtered. Such solution, it may be noted, is free from alkalis which gradually decompose the active esters and combine with the active acids rendering them less active. This novel solution is stable and may be stored substantially without impairment of efficiency.

Water may subsequently be added to this novel solution whereby there is produced a colloidal suspension of the active material in water which lends itself for use in the garden or field, or as a spray for use within homes. The degree of dilution of the novel solution with water depends upon the purpose for which it is to be used. For many kinds of insects a dilution of one part of the solution to forty (40) parts of water is effective.

Stronger or somewhat weaker dilutions may be used. The behavior of the acetone solution upon dilution with water is an important and novel feature of this invention. It has been above pointed out that the active principle of pyrethrum (which is dissolved in the acetone) is insoluble in water. Therefore, when water is added to the acetone solution, the active principle does not remain in solution, but is thrown out of solution as a colloidal suspension. This suspension does not settle but remains dispersed for a substantial length of time while the small amount of acetone aids in improving the wetting properties of the suspension. Attention may also be called to the fact that this acetone-water suspension is equal in killing strength to a straight acetone solution containing the same proportion of active material from pyrethrum flowers. For vaporizing in rooms to kill flies or mosquitoes the acetone-water suspension is more effective than a straight acetone solution containing the same proportion of active material.

Having thus described my invention, what I claim as new and desire to secure by Letters Patent, is:

1. An insecticide consisting of an active insecticidal principle and a water soluble ketone.

2. An insecticide consisting of the active principle of pyrethrum flowers and a water soluble ketone, which upon dilution with water a colloidal suspension of said principle is obtained.

3. The process of forming an insecticide which consists in finely dividing flowers of the genus Chrysanthemum having an active insecticidal principle and dissolving the principle thereof in a ketone said ketone being soluble so that a colloidal solution of the active principle may be formed upon water dilution.

4. A non-alkaline insecticide consisting of the active principle of pyrethrum flowers and acetone substantially in the proportions of one and two-thirds pounds of flowers to one gallon of acetone.

5. An insecticide consisting of an active insecticidal principle, a liquid water soluble ketone non-poisonous to man, and water.

6. A colloidal insecticide consisting of the active principle of pyrethrum flowers, a liquid water soluble ketone non-poisonous to man, and water.

7. A non-alkaline insecticide consisting of the active insecticidal principle of pyrethrum flowers, and a liquid water soluble ketone non-poisonous to man, which upon dilution with water obtains a colloidal and stable suspension and diffused condition of the active principle of the pyrethrum flowers.

8. The process of forming an insecticide which consists in finely dividing flowers of the genus Chrysanthemum to obtain the active insecticidal principle, dissolving the principle in a liquid water soluble ketone non-poisonous to man, and adding water.

9. The colloidal substance resulting from bringing together an ester of pyrethrolone with chrysanthemum-mono-carboxylic acid and chrysanthemum-di-carboxylic acid, a liquid water-soluble ketone and non-poisonous to man, and water.

In witness whereof, I have hereunto set my hand this 30th day of June, 1926.

CHARLES B. GNADINGER.